(12) United States Patent
Douglas

(10) Patent No.: US 6,599,428 B1
(45) Date of Patent: Jul. 29, 2003

(54) FILTER SYSTEM FOR REMOVING CONTAMINANTS FROM WATER AND METHOD THEREOF

(75) Inventor: John H. Douglas, Clearwater, FL (US)

(73) Assignee: Paragon Water Systems, Inc., Clearwater, FL (US)

( * ) Notice: Subject to any disclaimer, the term of this patent is extended or adjusted under 35 U.S.C. 154(b) by 195 days.

(21) Appl. No.: 09/736,637

(22) Filed: Dec. 14, 2000

Related U.S. Application Data

(63) Continuation-in-part of application No. 09/431,942, filed on Oct. 1, 1999, now abandoned.
(60) Provisional application No. 60/249,033, filed on Nov. 15, 2000.

(51) Int. Cl.⁷ .................................. C02F 9/00
(52) U.S. Cl. .................. 210/668; 210/669; 210/688; 210/694; 210/266; 210/282; 210/283
(58) Field of Search ..................... 210/668, 669, 210/694, 266, 282, 283, 688

(56) References Cited

U.S. PATENT DOCUMENTS

| | | | |
|---|---|---|---|
| 4,213,600 A | 7/1980 | Thompson, Jr. | 266/170 |
| 4,642,192 A | 2/1987 | Heskett | 210/638 |
| 4,798,672 A | 1/1989 | Knight | 210/232 |
| 4,863,103 A | 9/1989 | Gannaway | 239/289 |
| 5,006,240 A | 4/1991 | Steffero, Sr. | 210/223 |
| 5,008,011 A | 4/1991 | Underwood | 210/232 |
| 5,122,274 A | 6/1992 | Heskett | 210/638 |
| 5,135,654 A | 8/1992 | Heskett | 210/638 |
| 5,149,437 A | 9/1992 | Wilkinson et al. | 210/665 |
| 5,198,118 A | 3/1993 | Heskett | 210/638 |
| 5,256,299 A | 10/1993 | Wang et al. | 210/664 |
| 5,269,932 A | 12/1993 | Heskett | 210/638 |
| 5,275,737 A | 1/1994 | Heskett | 210/638 |
| 5,300,224 A | 4/1994 | Farley | 210/266 |
| 5,314,623 A | 5/1994 | Heskett | 210/638 |
| 5,401,416 A | 3/1995 | Levy | 210/668 |
| 5,411,665 A | 5/1995 | Scraggs et al. | 210/610 |
| 5,415,770 A | 5/1995 | Heskett | 210/202 |
| 5,433,856 A | 7/1995 | Heskett | 210/638 |
| D365,380 S | 12/1995 | Wilcock | D23/209 |
| 5,510,031 A | 4/1996 | Knauf, Jr. et al. | 210/460 |
| 5,510,034 A | 4/1996 | Heskett | 210/638 |
| 5,599,454 A | 2/1997 | Heskett | 210/638 |
| 5,603,844 A | 2/1997 | Murphy et al. | 210/757 |
| 5,635,058 A | 6/1997 | Bowman | 210/172 |
| 5,723,044 A | 3/1998 | Gleason et al. | 210/170 |
| 5,744,033 A | 4/1998 | Bertrand et al. | 210/282 |
| 5,772,119 A * | 6/1998 | Someya et al. | 239/315 |
| 5,823,229 A | 10/1998 | Bertrand et al. | 137/614.2 |
| 5,833,849 A | 11/1998 | Primdahl | 210/232 |
| 5,833,859 A | 11/1998 | Heskett | 210/638 |
| 5,837,134 A | 11/1998 | Heskett | 210/175 |
| 5,858,215 A | 1/1999 | Burchard et al. | 210/87 |
| 5,951,869 A | 9/1999 | Heskett | 210/638 |
| 5,975,434 A | 11/1999 | Douglas | 239/553.3 |
| 6,016,977 A * | 1/2000 | Farley | 239/553.3 |
| 6,093,313 A | 7/2000 | Bovaird et al. | 210/94 |
| 6,145,670 A | 11/2000 | Risser | 210/449 |
| 6,197,193 B1 * | 3/2001 | Archer | 210/266 |

* cited by examiner

*Primary Examiner*—Ivars Cintins
(74) *Attorney, Agent, or Firm*—Joseph A. Mahoney

(57) ABSTRACT

An improved filter device for the removal of contaminants from water and method of using same. The present invention comprises an outer housing having an inlet at one end for water to be purified and an outlet for purified water at an opposing end thereof. An inner filter is situated within and in fluid communication with the outer housing to remove contaminants from the water. Within the inner filter is an inner filter housing. Within the inner filter housing is at least one uniform region of dispersed granular copper media. A filter pad is positioned within the inner filter housing. Further, a region of granular activated carbon is positioned opposite the uniform region by the filter pad.

10 Claims, 7 Drawing Sheets

FILTER SYSTEM FOR REMOVING CONTAMINANTS FROM WATER AND METHOD THEREOF

RELATED APPLICATION

This application is a continuation-in-part of U.S. patent application Ser. No. 09/431,942, filed Oct. 1, 1999, now abandoned; and claims priority from U.S. Provisional Application No. 60/249,033, filed Nov. 15, 2000.

FIELD OF INVENTION

The present invention relates to fluid treatment. In particular, the present invention relates to filters in treatment of water.

BACKGROUND

It has been found that bathing or showering with tap water entails a number of hazards. For example, the skin may absorb undesirable constituents from the water particularly because pores of the skin are enlarged during a hot shower or bath. Additionally, to the extent that such undesirable constituents are not absorbed, harsh chemicals, such as dissolved chlorine and hydrogen sulfide, are irritating to the skin itself.

In the field of treating water for commercial, industrial and residential use, numerous systems have been proposed, many of which are cost and technically effective for purposes of removal of undesirable constituents from drinking water if the flow velocity is not high and the water is not warm. However, the development of water filters, particularly those adapted for use in showerhead applications is a comparatively recent development.

In such applications, the rate and volume of water flow is typically much greater and much warmer than is the case in applications in which the only objective is to provide contaminant-free drinking water. Accordingly, the prior art filtration concepts, which are workable in drinking water applications, are unsuitable in shower or bath applications and, to a considerable extent, the reverse is also true. A shower or bath intended filter which, inherently, is designed for high speed, large volume filtration of warm or hot water would not constitute an optimal system for purposes of low volume extraction of contaminants from cooler drinking water.

Therefore, there is a need for a water filter particularly suited for use in applications in which the rate and volume of water flow is typically much greater than is the case in applications in which the objective is to provide contaminant-free drinking water.

SUMMARY OF THE INVENTION

The present invention relates to an improved filter device for the removal of contaminants from water comprising a filter housing having an inlet at one end for water to be purified and an outlet for purified water at an opposing end thereof. Within the filter housing is at least one region of uniformly dispersed granular copper media.

In another embodiment, the filter system may further comprise a radial filter pad secured in the housing in integral radial contact with the region of copper granules.

In yet another embodiment, the filter system further comprises a region of granulated activated carbon (GAC), which has a particle size distribution of about 10 to about 100 mesh (based on US standard screen sizes). The GAC, in addition to its biologic absorbing properties, also absorbs radon which may be carried by the water passing into the filter system.

The system may also include one stainless steel screen for defining the inlet to the filter device and a second such screen immediately preceding the outlet thereof.

In yet another embodiment, the core is configured to direct the water from the inlet and through the uniform region. The radial space is configured to direct the water from the uniform region out through the outlet.

The present invention further comprises a method for removing contaminants from water comprising passing the water through a filter device comprising a filter housing and an inner filter housing. Next, the water is dispersed through a uniform region of copper medium disposed within the inner filter housing. The contaminants are next removed from the water by bonding the contaminants to the uniform region of copper medium. Next, organisms are removed from the water by reacting the organisms in an oxidation/reduction reaction with the uniform region of copper media. The water is then exited out of the filter housing.

DETAILED DESCRIPTION

Figure 1:
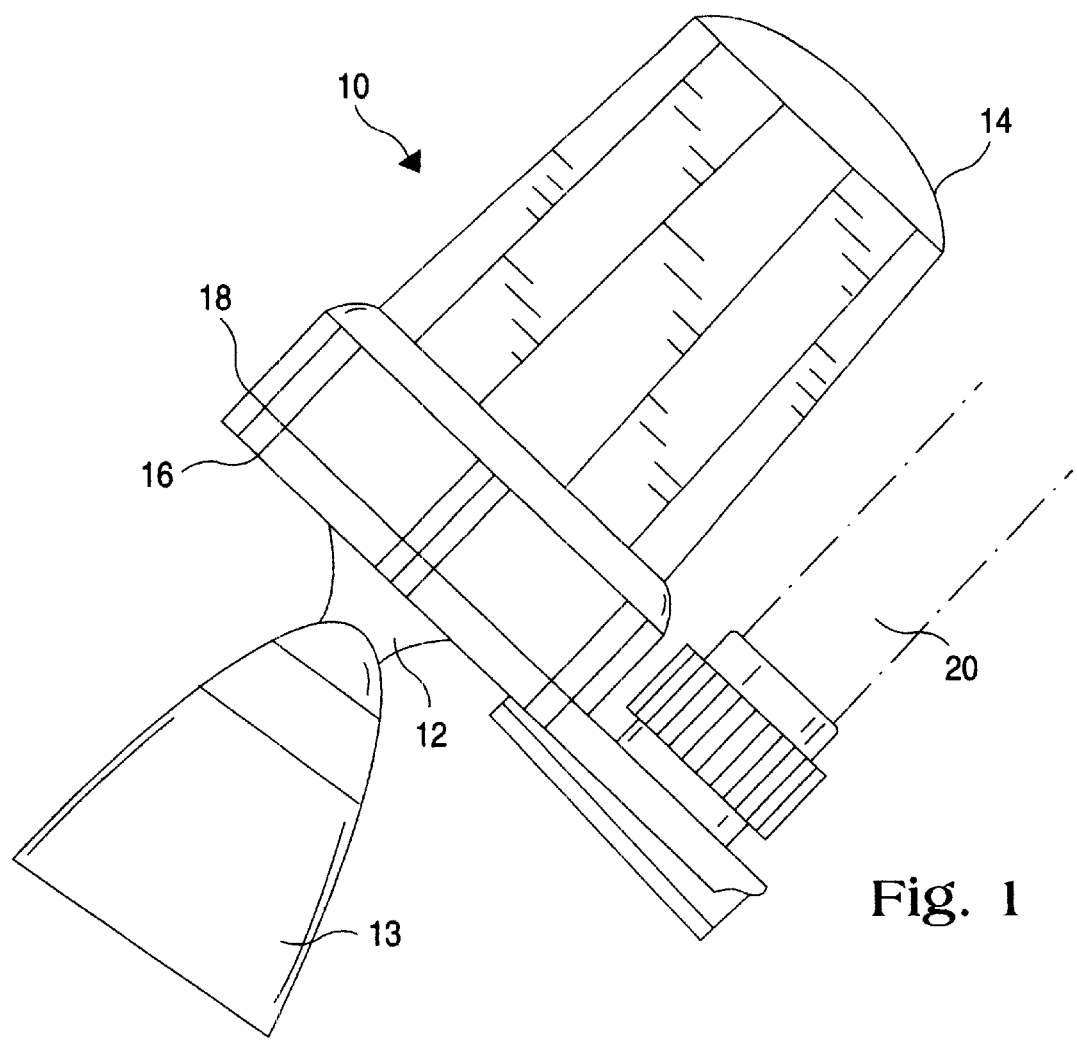
FIG. 1 is a side plan view of one embodiment of the filter system of the present invention attached to a showerhead.
Figure 3:
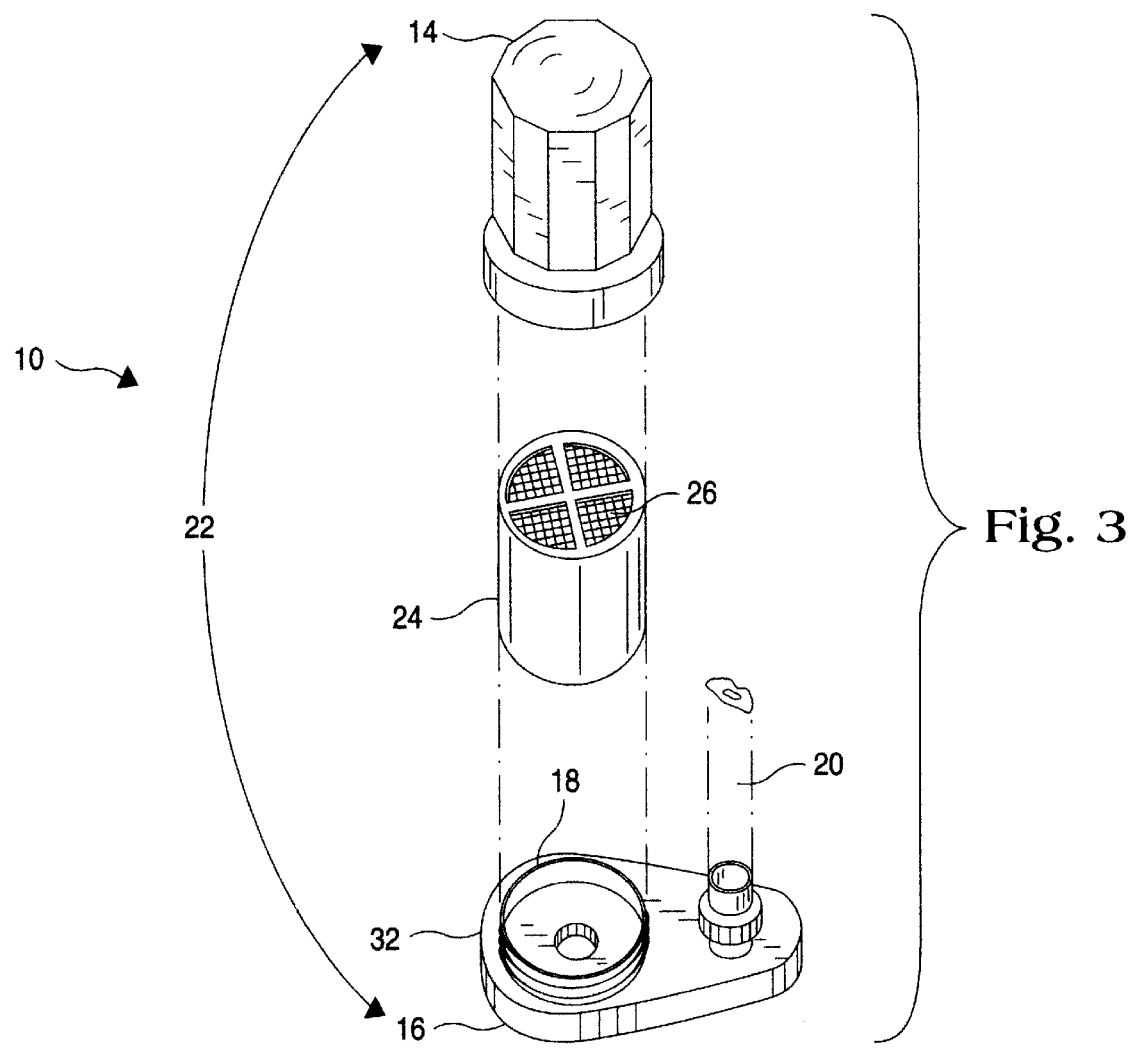
FIG. 3 is an exploded isometric view showing the insertion of the filter of FIG. 2 into the filter housing of FIG. 1.

Filter 10 is shown in FIG. 1 and FIG. 3. The outer housing 22 is characterized by a proximal portion 14 and a distal portion 16, which complementarily engage each other about a circumference 18 thereof. The outer housing 22 is further characterized by an inlet 20 and outlet 12. The outlet comprises a threaded or other connector that enables the attachment of a hose or showerhead 13. The outer housing 22 is characterized by a proximal portion 14 and a distal portion 16, which complementarily engage each other about a circumference 18 thereof. The outer housing 22 is further characterized by an inlet 20 and outlet or showerhead 12. The outer housing 22 is preferably constructed or injection molded of acrylonitrile-butadiene-styrene (ABS). Those skilled in the art will appreciate that any suitable temperature resistant thermoplastic material or other suitable material may be utilized for the outer housing 22.

Figure 2:
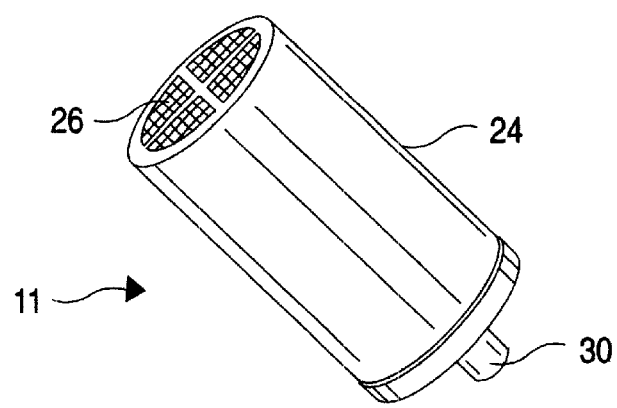
FIG. 2 is an isometric view of a filter housing of the present invention.

As shown in FIG. 2, secured within the outer housing 22 is an inner filter 11 including an inner filter housing 24, having a stainless steel mesh inlet 26 having a mesh value in a range of about 50 to about 100 microns. Inner filter housing 24 is also constructed of ABS or any other suitable material. A similar stainless steel mesh outlet 28 (shown in FIG. 4) is provided at filter outlet 30 of the inner filter housing 24.

The relationship between the inner filter 11 and the outer housing 22 is illustrated in FIG. 3 in which the proximal portion 14 of the outer housing 22 is shown removed. When assembled, insulation, anti-vibration padding, or structural stabilizing means or devices such as water resistant fibers, polyurethane foam, etc. may be affixed about the inner filter housing 24 within the outer housing 22. One skilled in the art will appreciate that outer housing 22 is not necessary to achieve the objects of the invention. For example, the inner filter housing 24 can be constructed of water tight plastic and serve as the outer barrier for the filter device.

As further illustrated in FIG. 3, the proximal portion 14 detachably affixes to the distal portion 16 by conventional threading or the like to provide a fluid tight seal. To improve the fluid tight seal, O-rings or other materials can be included around the circumference 18 and the filter outlet 30. Advantageously, the user can replace a spent inner filter 11 by unscrewing or otherwise detaching portions 14 and 16 and removing inner filter 11.

Figure 4:
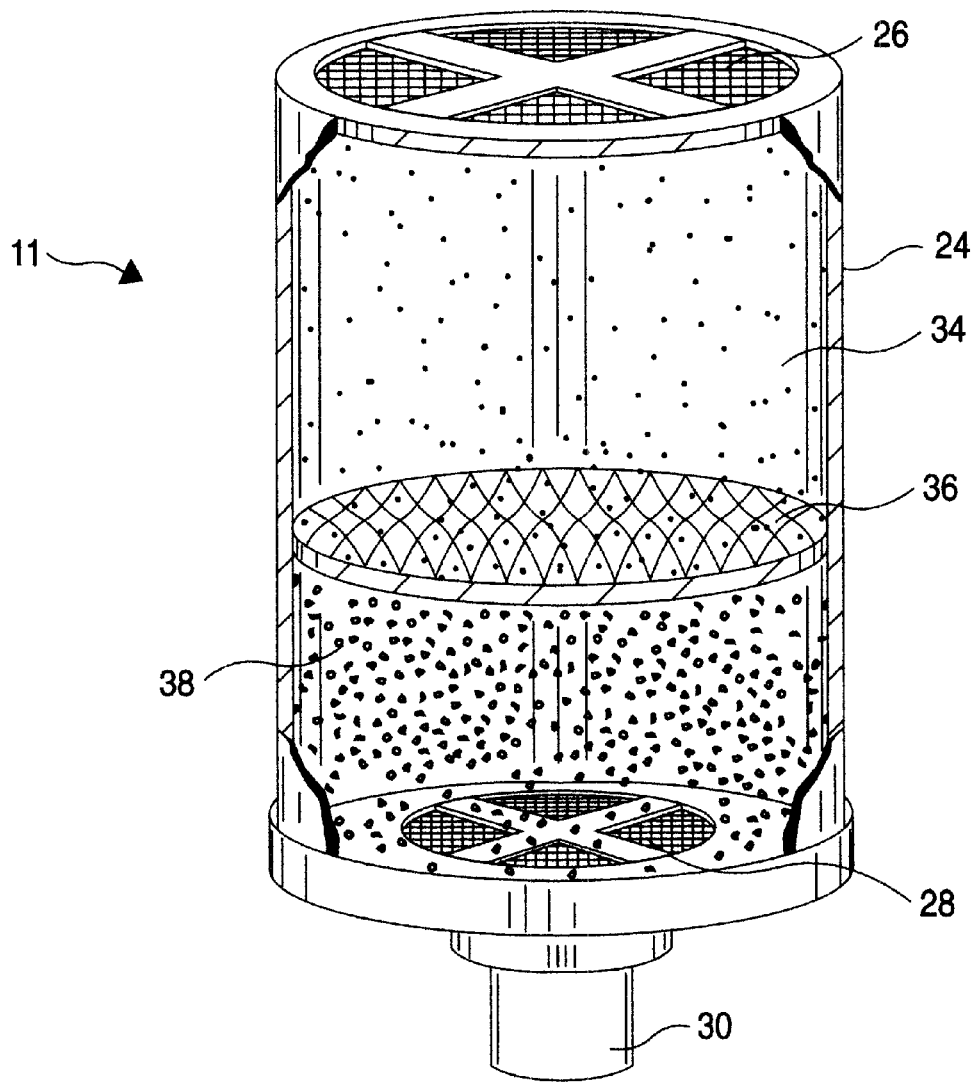
FIG. 4 is a cut-away isometric view illustrating the relationship of the components of the instant filter system.

With reference to FIG. 4, the inner filter 11 may comprise a uniform region 34 of granular copper media. In a preferred embodiment, the uniform region 34 of copper granules entirely fills the proximal or inlet region of the inner filter housing 24 and extends axially to at least about one-half of the axial length of the inner filter housing 24. Prior to use, the copper media is processed, in a manner similar to an annealing process, to remove oxides. It should be noted that the copper media might be placed at an inlet region, a center region, or at an outlet region of the inner filter housing 24 to achieve the objectives of the present invention. The amount of copper that may be used in the present invention is from about 90% to about 100% substantially pure copper with the preferred amount being 100%.

The granular copper is substantially free of contaminants. The particle size of the granular copper media is about 120 mesh, although in typical usage the particle size is from about 40 mesh to about 200 mesh. The density of the copper media is in the range from about 3.5 to about 5 grams/cc, while the density of one embodiment is about 4.25 grams/cc. The copper media is electrically conductive, and can range in size from a fine powder to very coarse spheres or pellets. Other contaminants in water, like lead and other heavy metals, are removed or reduced as the contaminant is bonded to the copper media. Further, it is believed that the copper oxidation/reduction reaction creates a poor environment for growth. Organisms specifically controlled include fungi, algae and bacteria.

Figure 5:
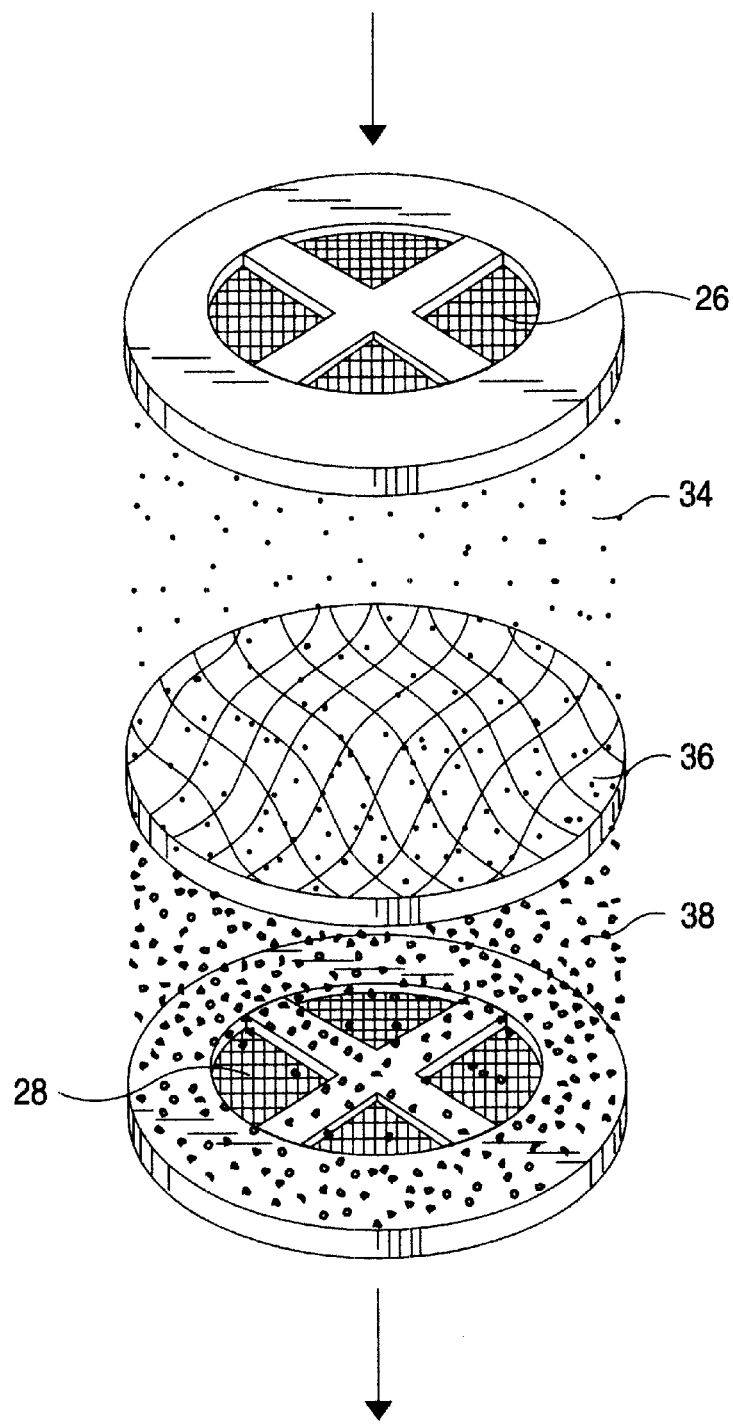
FIG. 5 is an exploded isometic view of the filter system of FIG. 4.

FIG. 5 shows the inner filter 11 with the inner filter housing 24 removed and indicates the direction of the flow of water through the inner filter while the filter 10 is in use. In the context of high speed, high volume fluid flow as is typical in showerhead applications, the use of copper granules having a particle size of from about 40 mesh to about 200 mesh, as a component within the filter system has been found to be more effective in removing contaminants than the use of other media known in the art. Specifically, through the use of a bed or region of copper, the removal of undesirable contaminants such as chlorine, nitrates, iron, and hydrogen sulfide may be effected. The present invention works especially well in sulfated waters where sulfates have been used as sequestering or flocculating agents.

As illustrated in FIG. 4 and FIG. 5, following the uniform region 34 of copper media is a filter pad 36. The filter pad 36 may be made of a mesh such as polymeric material such as polypropylene having a mesh size of from about 30 to about 200 microns, and in one embodiment about 100 microns. The filter pad 36 is useful as a particulate barrier, removing particles such as sediment and silt. Other materials known in the art, which may be used to make the filter pad 36 include, stainless steel mesh, copper mesh, polyester pads, Teflons® (DuPont) pads, or molded plastic or nylon screen materials.

In the preferred embodiment, downstream of the filter pad 36 is a region of granulated activated carbon (GAC) 38 for the removal of chlorine from the water to be purified. Further, the region of GAC 38 is used for taste and odor control. The GAC has a particle size of from about 10 mesh to about 100 mesh. It should be noted that the region of GAC 38 might be placed at the inlet region, center region, or at the outlet region of the inner filter housing 24 to achieve the objects of the present invention.

GAC is also characterized by a high adsorbitivity of gases, vapors and colloidal solids. Specifically, the region of GAC 38 is useful for reducing the radon content of the water to be purified.

Following region of GAC 38 is the stainless steel mesh outlet 28. As is known by those skilled in the art, other types of non-reactive screens/filters may be used in lieu of the steel inlet and outlet meshs 26 and 28, respectively.

The present invention therefore comprises a system capable of removing organic and inorganic contaminants regardless of form (liquid, solid or gas). Contaminants such as colloids and emulsions, as well as microbes, fungi and viruses, are also removed by the present system. See Lotts "Where Oxidation Reduction Media Work, Here are Five Ways to Use Them", incorporated herein by reference and attached herewith, regarding the uses of redox reactions. The granular copper media of the present invention having a particle size of greater than about 100 mesh has been found to be particularly suited for the removal of multi-phase inorganic contaminants in high flow, high volume applications.

Those skilled in the art can appreciate that other media, or combinations of media may be utilized in the present invention, including certain copper/zinc alloys, sodium sulfate and calcium sulfate.

Figure 6:
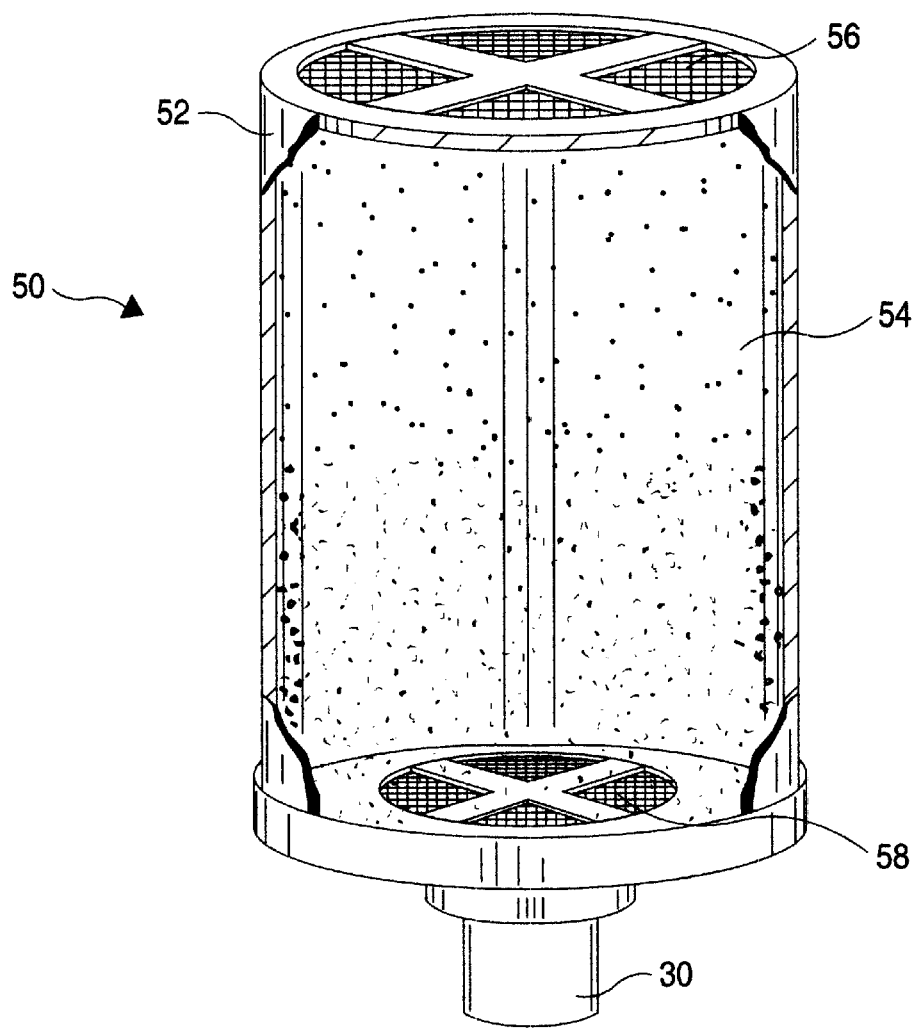
FIG. 6 is a cut-away isometric view illustrating an alternative embodiment of the present invention.

In an alternative preferred embodiment of the inner filter, as shown in FIG. 6, the inner filter 50 includes a uniform region 54 of copper granules entirely fills the inner filter housing 52 and is situated and extends between, in a homogeneous manner, the stainless steel mesh inlet 56 and the stainless steel mesh outlet 58. As shown in FIG. 6, the alternative embodiment may not utilize the filter pad. However, it should be known that the alternative embodiment may use the filter pad in a manner similar to that shown in FIG. 4.

Figure 7A:
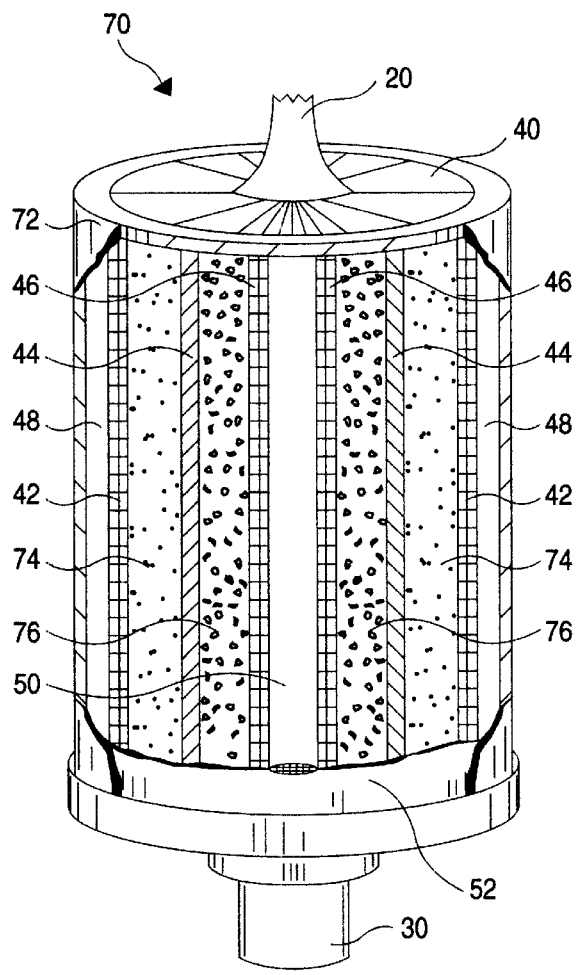
FIG. 7a is a cut-away isometric view of a radial flow embodiment of the present invention.
Figure 7B:
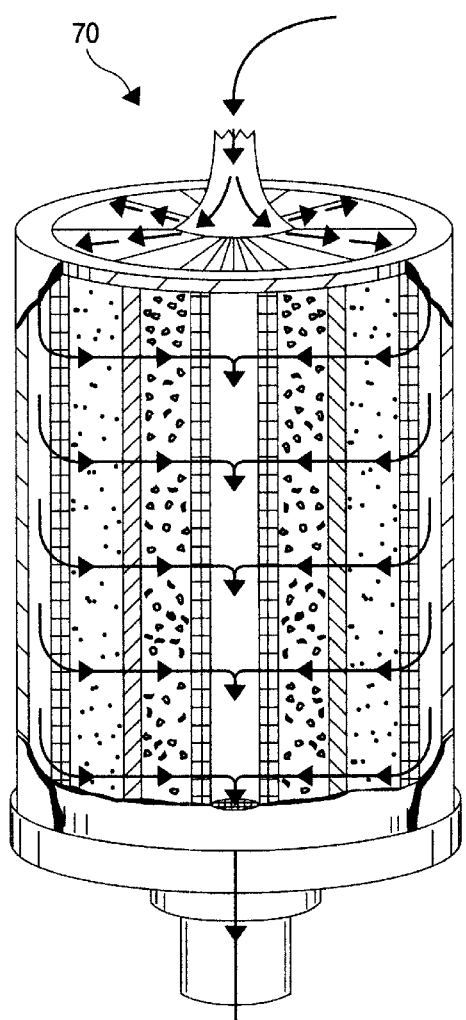
FIG. 7b is a cut-away isometric view of a radial flow embodiment of the present invention showing the flow pattern.

In another preferred embodiment of the inner filter, illustrated in FIG. 7A and FIG. 7B, the inner filter 70 is configured for radial inward flow of the water to be processed. The water entering inlet 20 of filter 10 and into the inner filter housing 72 first contacts a first cap 40, which is connected to and abuts an axial mesh inlet 42, the uniform region 74, an axially oriented filter pad 44, the region of GAC 76, and axial mesh outlet 46 to form a fluid-tight seal about the top portion of the inner filter housing 72 to channel the incoming water within a radial space 48 which surrounds the inner filter housing 72.

Axial mesh inlet 42 and axial mesh outlet 46 are similar to mesh inlet 26 and mesh outlet 28 described above. A second cap 52 seals all of bottom portion of the inner filter housing 24 except a core 50 to seal the radial space 48 thereby requiring the water to flow through the uniform region 74 of copper, the axially oriented filer pad 44, and the region of GAC 76 and into the core 50. Core 50 corresponds with and is in fluid communication with the outlet 30 to allow filtered water to flow out of filter 10. First cap 40 and second cap 52 can be made of plastic, stainless steel or any other suitable material. The second cap 52 is solidably configured to block water flow out of the second cap 52. Thus, the water radially flows from the radial space 48 through holes positioned on the core 50.

As illustrated in FIG. 7, uniform region 74 and region of GAC 76 are uniformly dispersed between the first cap 40 and the second cap 52 with the axially oriented filter pad 44 separating the two. The axial mesh inlet 42 separates the uniform region 74 of copper media from the radial space 48, and the axial mesh outlet 46 separates region of GAC 76 from core 50.

Figure 8A:
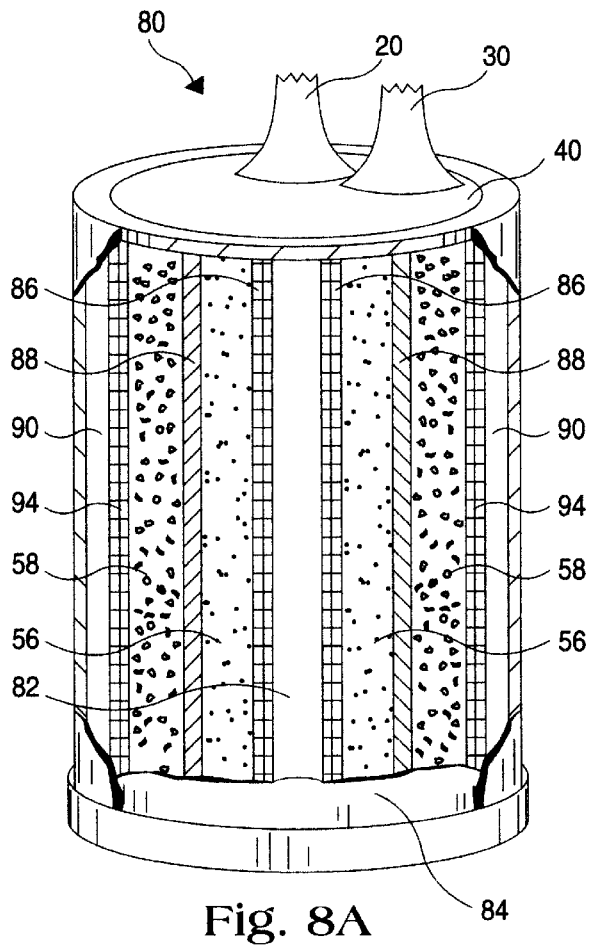
FIG. 8a is a cut-away isometric view of a reverse flow embodiment of the present invention.
Figure 8B:
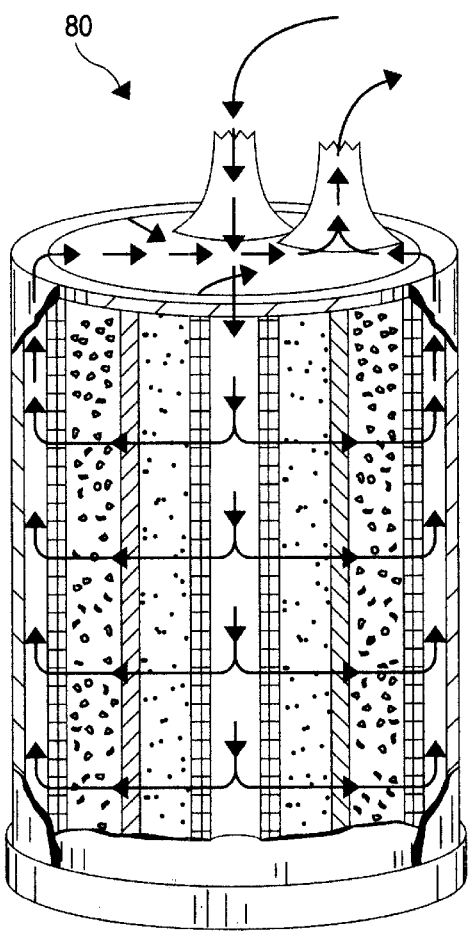
FIG. 8b is a cut-away isometric view of a reverse flow embodiment of the present invention showing the flow pattern.

In another preferred embodiment of the inner filter 80, a reverse flow configuration, illustrated in FIG. 8A and FIG. 8B, which is also a cylindrical type filter, may be employed whereby the core 82 separates the inner filter 80 into inner and outer sections 56 and 58, respectively. The core 82, which is plastic or other non-reactive material, has a gap or holes so that the water may flow from the inner section 56 to the outer section 58.

As shown in FIG. 8B, the water to be processed enters the inlet 20 and flows through the core 82. The second cap 84 is configured to radially direct the water through the axial mesh inlet 86 and into the inner section 56. The inner section can be comprised of a uniform region of copper. The water then flows from the inner section 56 through an axially oriented filter pad 88 and the outer section 58. The outer section 58 may comprise a region of GAC. The water then passes through axial mesh outlet 94 into the radial space 90. The radial space 90 is configured to direct the flow out of the outlet 30 preferably located at the first cap 92. Thus, the flow of water in the radial space 90 is in the reverse direction of the flow of water in the core.

Testing has shown that known filters in the art, such as the KDF filter media, have not met standards for use in high velocity flow type applications. The KDF filter media is a copper-zinc reduction/oxidation media that has been shown by testing to reduce chlorine, as well as other contaminants in tap water. KDF filter media remove or reduce chlorine and contaminants from water because of the electrical and catalytic potential of the reduction-oxidation (redox) reaction.

Testing, however, revealed that the KDF type 55 did not effectively remove chlorine from the tap water at a city water source that was treated with aluminum sulfate. Further investigation revealed that the aluminum sulfate treated water has a deleterious effect on the action of the KDF filter in reducing chlorine.

The present invention operates efficiently for the aluminum sulfate treated test water. Actual tests were applied in configurations containing both KDF type 55 (a copper-zinc alloy) and KDF/100C (a combination of a copper-zinc alloy and pure copper) and other filter configurations containing 100% copper. Testing demonstrated that the test sample results with the present invention were dramatically superior to the early test sample results where only KDF type 55 was used, and the later tests where both KDF type 55 and KDF/100C were used. For example, the KDF type 55 filter failed at 400 gallons, i.e. chlorine breakthrough occurred at low (less than 50%) chlorine reduction levels. The embodiment of the present invention containing 100% copper was effective at reducing the chlorine levels by greater than 90%, even beyond 4000 gallons. These test results demonstrated that the 100% copper of the present invention was superior in reducing chlorine for the specified capacity of 4000 gallons, while maximizing the water flow through the test filter.

A review of the test data for the 100% copper filter of the present invention, and KDF/100C, indicates that the 100% copper filter of the present invention has a reduction rate of 93.2% at a flow rate of 2.3 gpm after 4225 gallons, as compared to the KDF/100C reduction rate of 86.5% at a flow rate of 1.2 gpm. These results clearly indicate that the 100% copper filter of the present invention was superior in performance to the KDF/100C configuration, and the KDF type 55 configuration.

A summary of the specific test data follows:

| Copper 100 C of the present invention | | | KDF/100 C | | | KDF55 | | |
| --- | --- | --- | --- | --- | --- | --- | --- | --- |
| Gallons | Flow | Reduction | Gallons | Flow | Reduction | Gallons | Flow | Reduction |
| 4225 | 2.3 gpm | 93.2% | 4225 | 1.2 gpm | 86.5% | Test discontinued at 400 gallons due to poor results | | |
| Average Reduction = 94.4% | | | Average Reduction = 91.4% | | | | | |

Referring to FIG. 3 and FIG. 4, the present invention further comprises a method for removing contaminants from water comprising passing the water through the filter 10 comprising the outer housing 22 and the inner filter housing 24. Next, the water is dispersed through the uniform region 34 of copper medium disposed within the inner filter housing 24. The contaminants are next removed from the water by bonding the contaminants to the uniform region 34 of copper medium. Simultaneously, organisms are removed from the water by reacting the organisms in an oxidation/reduction reaction with the uniform region 34 of copper medium.

The method further comprises passing the water through the filter pad 36 secured within the inner filter housing 24 in fluid communication with the uniform region 34 of copper medium. Next, the water is dispersed through the region of GAC 38 secured within the inner filter housing 24 in fluid communication with the filter pad 36. The water is then exited out of the filter housing 24 through the outlet 30.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the claims appended herewith.

I claim:

1. A method for removing chlorine from sulfated water, comprising passing the water through a filter device, the filter device comprising:
   a. an outer housing comprising an inlet and an outlet;
   b. an inner filter, which is removably engageable from and in fluid communication with the outer housing, the inner filter comprising an inner filter housing, an inner filter housing inlet at one end and an inner filter housing outlet at an opposing end, the inner filter housing inlet being in fluid communication with the inlet, the inner filter housing outlet being in fluid communication with the outlet;
   c. a stainless steel mesh inlet at the inner filter housing inlet, the mesh inlet having a mesh of from about 50 to about 100 microns;
   d. a stainless steel mesh outlet at the inner filter housing outlet having a mesh of from about 50 to about 100 microns; and
   e. at least one uniform region of substantially pure copper media disposed within the inner filter housing and between the mesh inlet and mesh outlet, the copper media having a particle size of about 120 mesh and a density of about 3.5 grams per cubic centimeter.

2. The method of claim 1 wherein the copper media extends to at least about one-half of the inner filter housing.

3. The method of claim 1 wherein the device is a shower filter.

4. The method of claim 1 wherein the device further comprises a filter pad having a mesh of from about 30 microns to about 200 microns.

5. The method of claim 4 wherein the device further comprises a region of granulated activated carbon separated from the copper media by the filter pad.

6. The method of claim 5 wherein the granulated activated carbon has a particle size of from about 10 mesh to about 100 mesh.

7. The method of claim 4 wherein the filter pad comprises a polymeric pad.

8. The method of claim 4 wherein the filter pad comprises a polypropylene pad.

9. The method of claim 4 wherein the filter pad is secured within the inner filter housing in fluid communication with a distal portion of the region of the copper media.

10. The method of claim 1 wherein the device is a shower filter, which is capable of removing at least about 90% of the chlorine when the water is passed through the filter at a rate of about 2.3 gallons per minute.

* * * * *